July 10, 1928.
B. O. DAHL
TRAP
Filed March 16, 1925
1,676,427
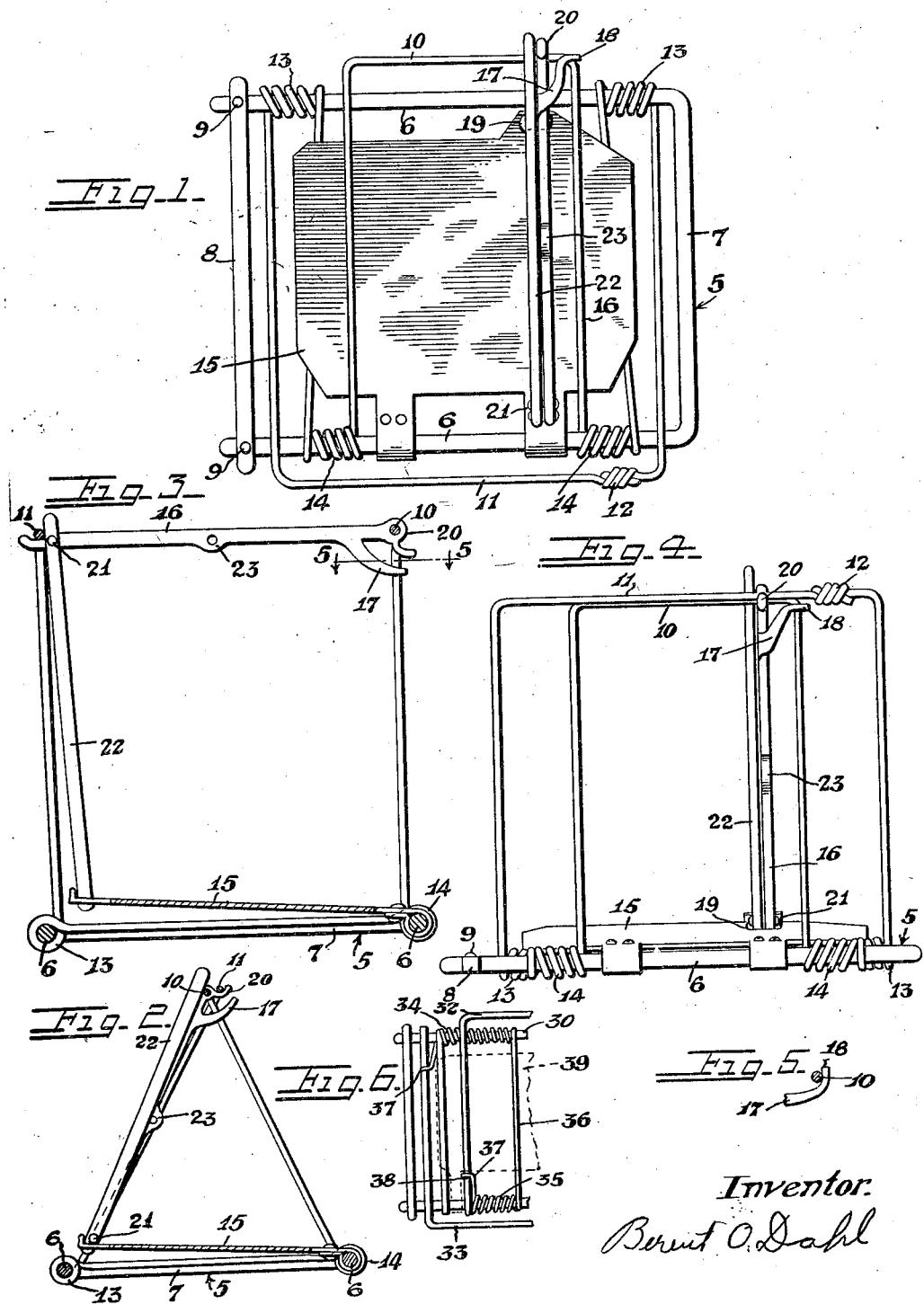
Inventor.
Berent O Dahl Patented July 10, 1928.

1,676,427

UNITED STATES PATENT OFFICE.

BERENT O. DAHL, OF VIROQUA, WISCONSIN.

TRAP.

Application filed March 16, 1925. Serial No. 16,073.

This invention relates to traps and more particularly to traps of the spring jaw type.

The primary object of the invention is to provide a trap of this type which will instantly kill the animal caught therein, eliminating any possibility of the animal releasing itself after it has been crippled by the trap.

A still further object of the invention is to provide a trap of this character capable of adjustment to permit its use in capturing animals of various sizes, and to be caught when entering the trap from any one of the four different directions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a trap constructed in accordance with the invention, showing the same with the jaws in their active positions.

Figure 2 is a vertical sectional view of the trap when the jaws are in their set positions and the trap has been set for catching comparatively small animals.

Figure 3 is a vertical sectional view through the trap, the jaws being shown as set for catching relatively large animals.

Figure 4 is a rear elevational view of the trap.

Figure 5 is a sectional view taken on line 5—5 of Figure 3.

Figure 6 is a fragmentary plan view of a slightly modified trap.

Referring to the drawings in detail, the reference character 5 designates the base of the trap which is formed preferably of a length of wire bent to provide parallel side edges 6 and an end section 7 the free ends of the side edges of the base being held in spaced relation by means of the bar 8 connected to the members 6 at 9.

The jaws of the trap are indicated by the numerals 10 and 11, the jaw 10 being relatively narrow as compared with the jaw 11 providing a structure wherein the jaw 10 may move within the jaw 11. The jaws 10 and 11 are formed preferably from a length of steel wire that has its ends connected as shown at 12, portions of the steel wire at points adjacent to the inner ends of the jaw 11 being formed into coiled portions 13 adapted to be positioned over the members 6 as shown by Figure 1 of the drawings.

As shown, the steel wire passes from one of the members 6 to the adjacent member 6, where coils 14 are provided, the ends of the coils 14 forming parts of the side members of the jaw 10, so that when the jaws 10 and 11 are moved upwardly, the action of the coils will be to normally urge the jaws 10 and 11 towards the base 5.

Hingedly supported on the base 5 is a treddle indicated at 15 which is in the form of a relatively wide plate on which the animal passing into the trap must tread, and which plate will operate to release the jaws in a manner to be hereinafter more fully described.

Pivotally mounted on the jaw 10 is a trigger indicated at 16 which carries an arm 17 provided with a right angled extremity 18, designed to engage one of the side members of the jaw 10, when the trigger is moved to its active or set position to prevent the jaws from acting under the pressure of the coiled portion of the jaws.

The trigger 16 is relatively long and has its lower end constructed to be positioned in the opening 19 formed in the plate or treddle 15, the construction of the jaws being such as to urge the free end of the trigger outwardly against one wall of the treddle to frictionally hold the jaws in their set positions.

Formed integral with the trigger 16 is an arm 20 that extends rearwardly and acts as a support for the jaw 11 that operates to exert an outward pressure on the free end of the trigger when the jaws are in their set positions. Pivotally connected with the trigger at 21, is an arm 22, the connection between the trigger 16 and arm 22 being made at a point in spaced relation with one end of the arm 22, so that when the trap is to be set for catching larger animals, the jaw 11 may rest between the ends of the members 16 and 22 in a manner as clearly shown by Figure 3 of the drawings, thereby making a larger space between the jaws when in their set positions.

The lower end of the arm 22 is also adapted for positioning in the opening formed in the treddle so that the frictional contact between the arm 22 and wall of the opening of the treddle will tend to hold the jaws in their set positions against the tensions caused by the coiled portions of the jaws.

The trigger 16 is provided with an opening 23 to which a suitable bait may be tied or otherwise secured so that it will be necessary for an animal to pass onto the treddle 15 in order to obtain the bait.

In the form of the invention as illustrated by Figure 6 of the drawings, the side members are indicated by the reference character 30 which are held in spaced relation by means of end members 31, and since this view only illustrates one end of a trap, one of these end members is shown.

In this form of the invention, jaws are indicated by the reference characters 32 and 33 respectively, which jaws are formed with suitable openings to accommodate the members 30, whereby the jaws are pivotally connected with the members 30.

The jaws 32 and 33 are urged to their active positions by means of the coiled springs 34 and 35 respectively, which are formed at the ends of the wire 36, the coiled portions surrounding portions of the side members 30 as clearly shown by Figure 6.

Arms 37 are formed at the ends of the coiled portions 34 and are provided with hooks 38 that engage over the jaws 32 and 33 to exert a pressure thereon. Supported under the jaws is the treddle 39 which is operated by an animal stepping thereon, the treddle being connected with the jaws in a manner as shown by Figure 3 of the drawings.

In the operation of the device, the trap is set either in a position as shown by Figure 2 or Figure 5 of the drawings, whereupon any weight on the treddle will cause the treddle to move downwardly, releasing the trigger or arm engaging the treddle, causing the jaws to move downwardly to a position in proximity to the treddle.

It will thus be seen that the animal standing on the treddle will be caught by the jaws and held to the base of the trap.

I claim:—

1. A trap comprising a base, a pair of spring urged jaws pivotally supported on opposite sides of the base and adapted to swing one within the other, a trigger rod pivotally mounted on one of the jaws having an arm adjacent the pivoted end thereof and adapted to serve as an abutment for the other jaw when trap is set and thereby urge the end of said rod outwardly, a treddle pivotally mounted on the base, said treddle having an opening, the free end of said rod being adapted to be inserted within the said opening when the trap is set whereby upon the depression of the said treadle the trap is sprung.

2. A trap comprising a base, a pair of spring urged jaws pivotally mounted on the opposite sides of the base and adapted to swing one within the other, a trigger bar pivotally mounted on one of the jaws and having an arm adjacent the pivoted end thereof, a second arm angularly disposed on said rod, a bar pivotally mounted near the free ends of said rod and said bar, a treadle pivotally mounted on the base, said treadle having an opening, the free end of the rod being adapted to be positioned in the opening when the trap is set for small animals, said first mentioned arm in this position being adapted to support the other jaw and be thereby urged outwardly, the free end of the bar being adapted to be positioned in the said opening when the trap is set to trap larger animals, and in this second position the second mentioned arm being adapted to abut the side of the jaw on which the rod is pivoted, and the second jaw being adapted to abut between the pivoted points of the bar and rod and urge the bar outwardly whereby upon the depression of said treadle the trap is sprung.

In testimony that I claim the foregoing as my own, I have hereto affixed my signature.

BERENT O. DAHL.